United States Patent [19]
Carriere

[11] Patent Number: 5,504,778
[45] Date of Patent: Apr. 2, 1996

[54] ANALOG CIRCUIT FOR BASEBAND MODEM

[75] Inventor: Vincent Carriere, Paris, France

[73] Assignee: Telecommunications Radioelectriques et Telephoniques, TRT, Paris, France

[21] Appl. No.: 353,437

[22] Filed: May 23, 1994

Related U.S. Application Data

[63] Continuation of Ser. No. 162,816, Dec. 3, 1993, abandoned, which is a continuation of Ser. No. 33,994, Mar. 19, 1993, abandoned, which is a continuation of Ser. No. 713,022, Jun. 6, 1991, abandoned, which is a continuation of Ser. No. 275,050, Nov. 22, 1988, abandoned.

[30] Foreign Application Priority Data

Nov. 24, 1987 [FR] France .................................. 87 16253

[51] Int. Cl.$^6$ .................................................. H04B 1/38
[52] U.S. Cl. ........................ 375/222; 370/32.1; 379/406
[58] Field of Search .................................. 375/222, 229, 375/295, 296, 316; 370/32, 32.1; 333/123, 28 R, 178, 18; 379/93, 406

[56] References Cited

U.S. PATENT DOCUMENTS

| | | | |
|---|---|---|---|
| 4,607,231 | 8/1986 | Nakawama | 333/18 |
| 4,686,686 | 8/1987 | Nakayama et al. | 375/11 |
| 4,689,805 | 8/1987 | Pyhälammi et al. | 375/11 |
| 4,768,205 | 8/1988 | Nakayama | 333/173 X |
| 5,297,163 | 3/1994 | Pfeiffer | 375/222 |

OTHER PUBLICATIONS

"Commutation et Transmission" No. 1, 1985.

*Primary Examiner*—Stephen Chin
*Assistant Examiner*—Tesfaldet Bocure
*Attorney, Agent, or Firm*—Steven R. Biren

[57] ABSTRACT

So as to be directly connected to the predefined logic circuit PLC to form a baseband modem, the analog circuit BBAC is monolithically integrated in accordance with the CMOS technology, using switched-capacitor filters which are driven by only one clock. The automatic equalizer EGA is likewise designed from switched-capacitor filters, equalization being obtained by variable and symmetrical clipping of the signals. In these conditions the modem can operate automatically in a very wide range of data rates.

2 Claims, 3 Drawing Sheets

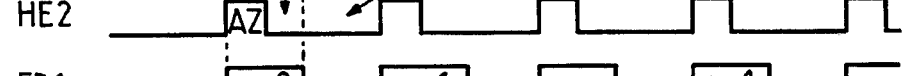
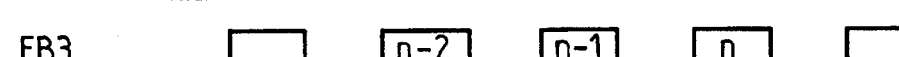
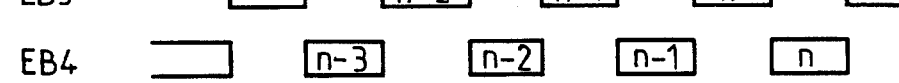
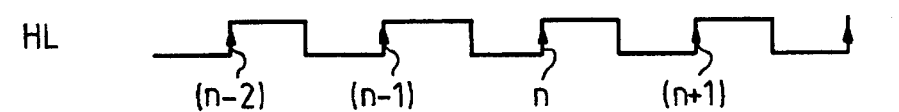

ANALOG CIRCUIT FOR BASEBAND MODEM

This is a continuation of application Ser. No. 08/162,816, filed Dec. 3, 1993 which was a continuation application of Ser. No. 08/033,994, filed Mar. 19, 1993, which was a continuation of application Ser. No. 07/713,022, filed Jun. 6, 1991, which was a continuation of parent application Ser. No. 07/275,050, filed Nov. 22, 1988, all now abandoned.

BACKGROUND OF THE INVENTION

The present invention relates to an analog circuit for a baseband modem associated with a predefined logic circuit and comprising members which effect electronic functions on electric signals including, for example, filtering, amplification, putting an analog delay into effect, comparisons, automatic equalization by means of a non-linear arrangement.

Such an analog circuit is disclosed in the publication "Commutation et Transmission", no. 1, 1985, which describes a "baseband modem operating in duplex over two wires". The modem is mainly comprised of a predefined logic circuit which provides the functions which are linked to transmission, to echo cancelation and to reception and have a plurality of passive and active bipolar circuits which provide the analog functions including amplification, filtering, putting an analog delay into effect, comparison and automatic equalization. Equalization in particular is obtained by means of a non-linear arrangement constituted by a high-pass filter whose cut-off frequency varies automatically by the action of diodes which short-circuit a capacitor to a certain extent. Such a modem has already a level of integration, however to still further improve its compactness and its reliability as well as to reduce its power consumption still more it is desirable for several analog functions to be combined in a CMOS integrated circuit which thus might be directly associated with the predefined logic circuit. At any rate, the integration of these analog functions poses obvious difficulties, more specifically as regards the impossiblity of realizing in CMOS technology the diodes which are necessary for the automatic equalization.

The invention has for its object to obviate these difficulties and proposes means to significantly reduce the volume and the electric power consumption and as a result thereof to improve the reliability and the reproducibility of such a modem, while reducing its cost.

SUMMARY OF THE INVENTION

The analog circuit for a baseband modem of the type defined in the opening paragraph, is characterized, in that for direct connection to the predefined logic circuit, it is monolithically integrated in accordance with the CMOS technique which utilizes filters with switched capacitors driven by one single clock, The frequency is a multiple of the frequency of the send clock of the modem, said filters adapting themselves automatically to the data rate, the automatic equalization likewise being obtained, and more specifically without control, by varying and symmetrical clipping of the signals by means of a circuit comprising filters having switched capacitors of only one type.

Such an embodiment based on switched-capacitors filters which are driven by one single clock allows a synchronous switching of the set of filters of the modem, which implies that the filters are no longer switched one after the other, and this also when the modem is subjected to a frequency change, that the modem operates in the synchronous or the asynchronous mode. In addition, the use of filters having switched capacitors of a single type to reproduce the automatic equalization function is particularly simple and versatile in contrast to the usual techniques which employ either the stochastic gradient algorithm or the automatic switching of several high-pass filters. The equalization is obtained by variable and symmetrical clipping of the signals as, in accordance with the length of the line, the level of the received signal is actually of a more or less high level and the signal which is clipped thus to a greater or less extent, and this signal is additionally clipped in a symmetrical manner relative to a fixed voltage for correct interpretation during its decoding.

BRIEF DESCRIPTION OF THE DRAWINGS

The following description which is given by way of non-limitative example with reference to the accompanying drawings will facilitate understanding how the invention can be put into effect.

FIGS. 3a–3h show a timing diagram relative to the analog delay function.

DETAILED DESCRIPTION OF THE INVENTION

Figure 1:
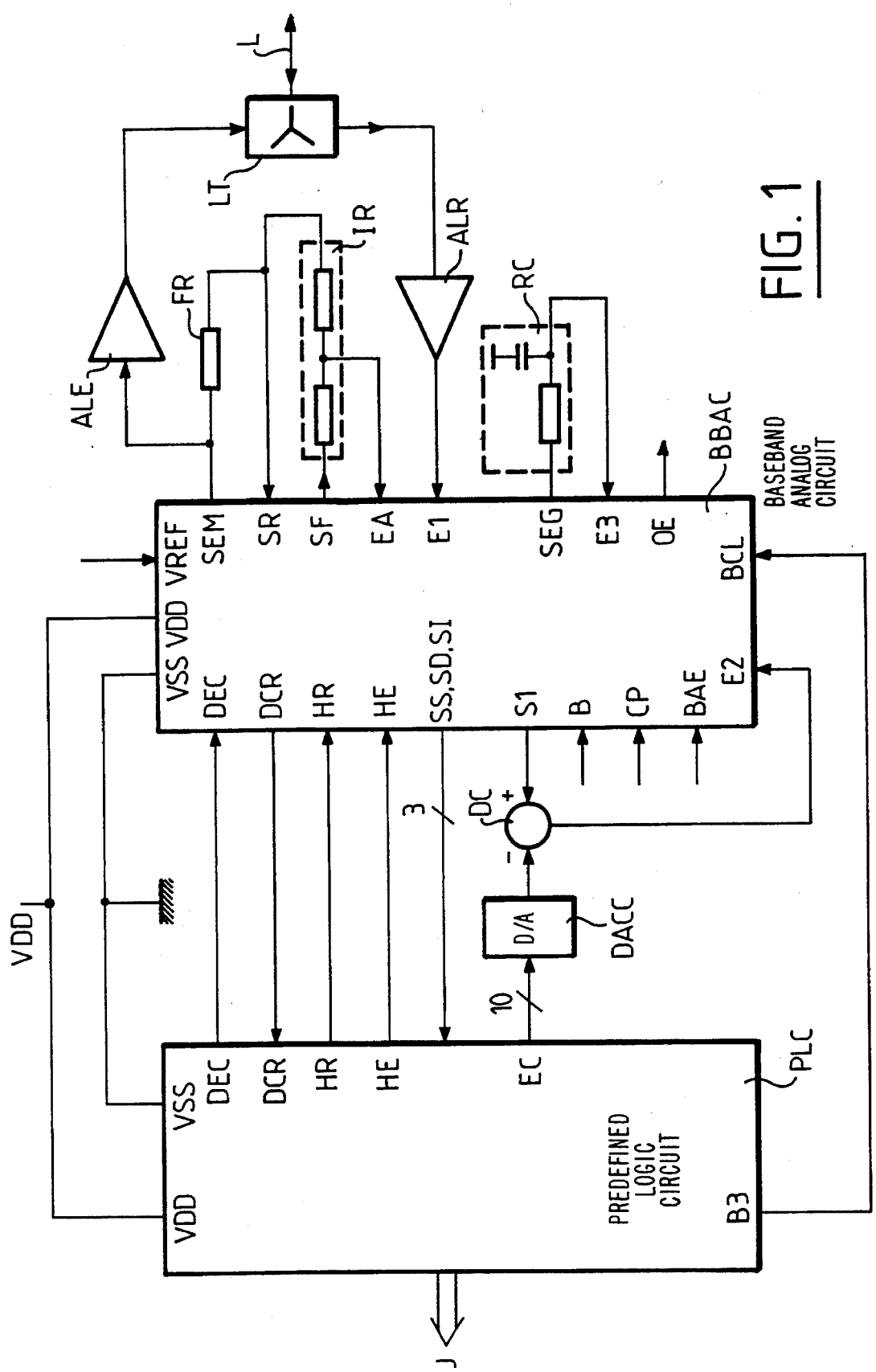
FIG. 1 shows the integrated analog circuit according to the invention and its environment, the assembly constituting a baseband modem.

In FIG. 1 the baseband analog circuits BBAC with 24 connection terminals is connected predominantly to the predefined logic circuit PLC. The several functions of the different connection terminals will be explained during the description of FIG. 2.

The supply voltages are applied to the terminals VDD, VSS and VREF and are decoupled from each other (the decoupling capacitors are not shown in the drawing). The supply terminal VSS of the circuits BBAC and PLC is adjusted to 0 V potential, while the supply terminal VDD of these circuits is adjusted to a positive potential (for example 10 V±5%). The potential on the supply terminal VREF of the circuit BBAC is equal to (VDD–VSS)/2 (with, for example, a tolerance of±1%). Assuming Fo to be the reference frequency which can vary from, for example, 1 kHz to 21 kHz, the circuit PLC produces a clock HR and a clock HE which are transmitted to the circuit BBAC. The clock HR=48 Fo is the general clock of the circuits BBAC while the clock HE=4 Fo is the sampling clock, these clocks HR and HE being synchronized with descending edges.

Three control signals are applied to the terminals BCL, BAE and B of the circuits BBAC. The signal ["0"(VSS) or "1"(VDD)] on the terminal BCL is transmitted from the terminal B3 of PLC and allows the control of the loop test 3 which is the feedback of a fraction of the transmitted signal to the receiving side, while no signal must be transmitted over the line L and no signal from the side of the junction J must disturb the feedback. The signal ("0" or "1") at the terminal BAE permits setting the logic outputs denoted SS, SD, SI and DCR in accordance with a predetermined configuration (which is described in detail in the description with reference to FIG. 2). The signals at the terminals BCL and BAE thus permit testing of the modem in its various functions and more specifically in its echo cancelling function (which function is realized by the circuit PLC). Finally, the signal ("0" or "1") at the terminal B renders a change in the frequency range for the continuous filters possible.

Different analog signals are transmitted or transferred towards or by the circuit BBAC and are present at the terminals listed hereafter.

Terminal SF: transmission signal output, filtered by a transmission filter PBEM

Terminal SR: resistor output. A resistor IR external to the circuit BBAC is arranged between the terminal SR and the terminal SF and serves as the input resistance of an amplifier for matching the level of the transmission signal AEM.

Terminal SEM: transmission signal output connected to the output of the matching amplifier AEM. The transmission signal is transferred towards a transmission line amplifier ALE at the end of the line L. A negative feedback resistor FR of the amplifier AEM external to the circuit BBAC is arranged between the terminals SEM and SR.

Terminal EA: analog input to which a signal is applied which when the terminal BCL has the "0" value is transferred on the one hand to the input of a filter PBRE and on the other hand towards an input of an equalizer EGA (the filter PBRE and the equalizer EGA will be described in detail with reference to FIG. 2). The analog signal present at the terminal EA is a fraction of the filtered transmission signal SR.

Terminal E1: this terminal is connected to the input of the filter PBRE when the terminal BCL has the "1" value. It receives the output signal from the receiving line amplifier ALR from the line L.

Terminal E2: this terminal is connected to the input of an analog delay line ADN (described with reference to FIG. 2). It receives the signal coming from a differential circuit DC.

Terminal SEG: this terminal is connected to the output of the equalizer EGA.

Terminal E3: this terminal is an input of the equalizer EGA which in accordance with a characteristic feature of the invention allows the shift voltage present at the output of the equalizer EGA to be compensated for, an integrating circuit RC being connected between the output SEG and the input E3 of the equalizer EGA.

Terminal OE: "eye" output, designated thus as it allows the analog output signal of the equalizer EGA to be observed.

Terminal S1: filtered received signal output connected to the output of the filter PBRE. This filtered received signal is applied to the positive input of the differential circuit DC. Actually, the receiving signal is received with an echo, which is caused by impedance differences between lines and modems or by the mismatch between distant modems, which echo must be minimized or cancelled. To that end the logic circuit PLC is provided with an echo canceller which estimates the incident echo, the output of the echo canceller EC (10 wires) then carries an estimated digital echo signal and is connected to a digital-to-analog converter circuit DACC, which converts the incoming logic signal into an analog estimated echo signal which is applied to the negative input of the differential circuit DC. Thus, at the output of the differential circuit DC a signal is available which is the filtered received signal whose estimated echo has been subtracted. This signal, as has been described already in the foregoing, is applied to the terminal E2.

Finally, logic signals are conveyed to the subsequent terminals of the baseband analog circuit BBAC.

Terminal DEC: transmission signal input. These input data are encoded and transmitted by the logic circuit PLC and are transferred via the terminal DEC to the input of the transmission filter PBEM. From this terminal the received encoded data are outputted. These encoded data are transmitted to the output of the equalizer EGA and are transferred via terminal DCR to the logic circuit PLC with the object of being decoded.

Terminal CP: this is the control terminal of the cut-off frequency of a pre-equalizer filter PREG positioned at the input of the equalizer EGA. This filter PREG samples the signal present at its input at the rate 12 Fo. The signal ("0" or "1") at the terminal CP allows the switching of the cut-off frequency fc at −3 dB, for example:

For CP= "0" fc= 0.22 Fo for CP= "1" fc= 0.4 Fo.

The output terminals SS, SD and SI are connected to the logic circuit PLC for transferring either the error signals utilized by the echo canceller for cancelling the estimated echo when the terminal BAE is at "0", or for blocking the echo canceller when the terminal BAE is at "1".

The terminals SS, SD and SI are connected in the circuit BBAC to a register LAT which has for its object to store at an ascending edge of the clock signal the value of the logic outputs of three comparators C1, C2, C3, which cooperate with the delay line ADN and to make these values available for use by the echo canceller of the circuit PLC.

In order to complete the description of the near environment of the circuit BBAC, it is sufficient to state that the transmission line amplifiers ALE and the receiving line amplifiers ALR, respectively, transmit and receive the data on and from the (2-wire) telephone line L via the line transformer LT which is thus insulated from the transmission output SEM and the receiving input E1.

Figure 2:
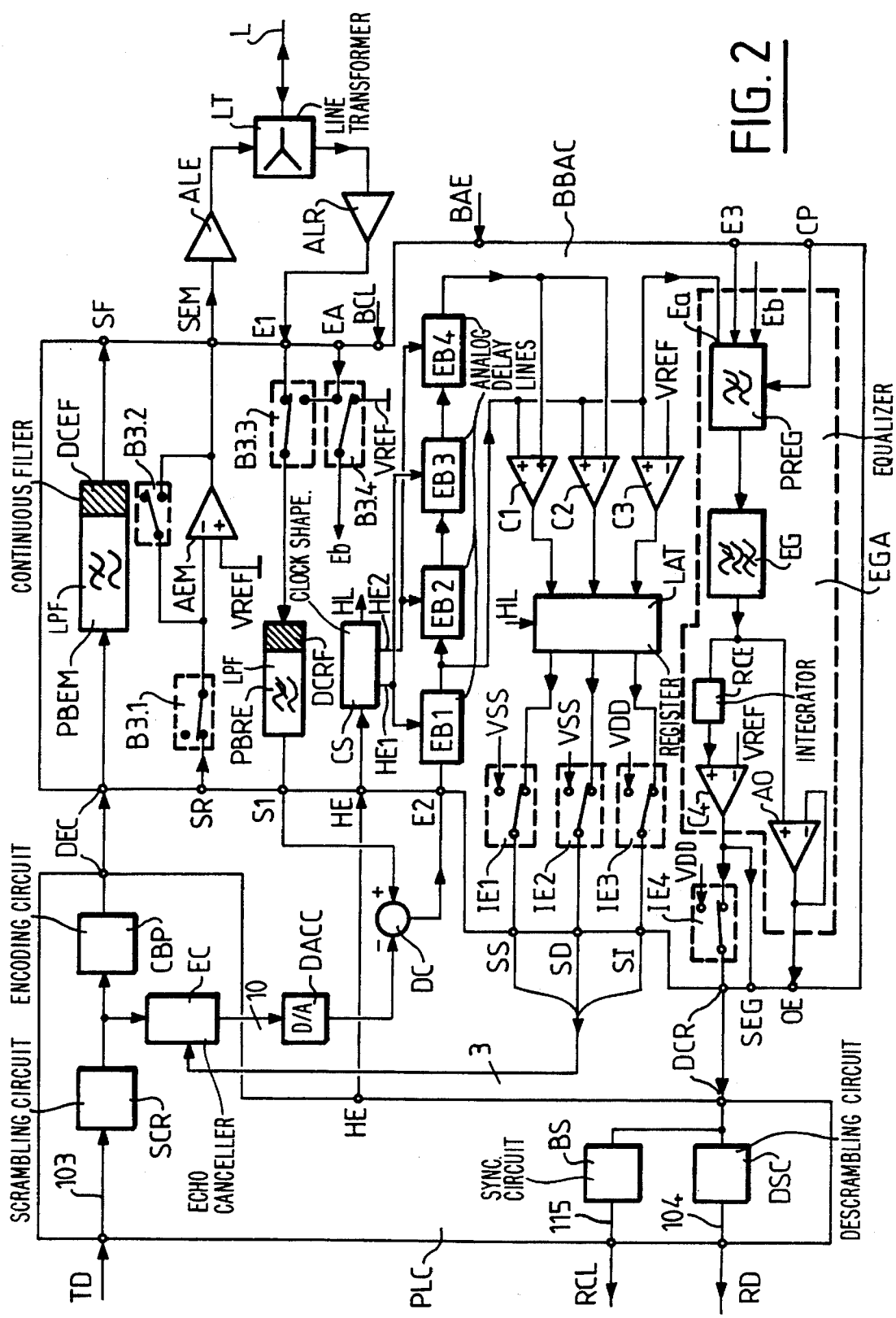
FIG. 2 shows a block diagram of the baseband modem.

FIG. 2 shows a proposed block diagram of the baseband modem in which the several functions of the analog circuit BBAC are shown in detail, while certain functions of the logic circuit PLC necessary for a better understanding of the mode of operation of the circuit according to the invention will be apparent. Elements corresponding to those in FIG. 1 have been given the same reference numerals.

According to the basic idea of the invention, the analog circuit is integrated in CMOS technology, using switched-capacitor filters which are driven by a single clock whose frequency is a multiple of the frequency of the transmission clock of the modem, said filters adapting themselves automatically to the data rate, the automatic equalization function also being obtained, and that without control, by variably and symmetrically clipping signals by means of a circuit comprising switched-capacitor filters of one single type. On the one hand, compatability with the logic circuit PLC, power consumption reduction, better reproducibility are thus ensured while reliability, and compactness are improved at a very low cost and on the other hand an automatic adaptation to the data rate is obtained by using switched-capacitor filters in CMOS technology. Actually, these switched-capacitor filters driven by a single clock automatically adapt themselves to the data rate, which rate can vary from, for example, 1 kbit to 21 kbit. Moreover, the implementation of the equalizer circuit as described hereinafter, using switched-capacitor filters of one single type, results in a simplification in the integration while still ensuring an effective adaptation without adjustment of the slopes of the filter.

The different types of filters used in the sequel of this description are analysed in the reference 1: "Les Filtres Actifs", by Paul Bildstein, in Edition de la Radio.

The data TD to be transmitted, present on the wire 103 (standard RS 232-V24), are scrambled in the logic circuit PLC by means of a scrambling circuit SCR whose output is connected to an input of an echo canceller EC and also to the input of an encoding circuit CBP to be converted in accordance with a biphase code which is currently used in this type of modem. Thus coded, they are transferred to the input terminal of the transmission signal DEC of the integrated analog circuit BBAC. The terminal DEC is connected to the input of a transmission low-pass filter PBEM which filters the logic signal and recovers an analog signal which is symmetrical with respect to the reference voltage VRF. The filter PBEM is a fourth-order low-pass filter of the Bessel type (reference 1), whose cut-off frequency of −3 dB was in this embodiment equal to 0.92 Fo and the clock frequency HR equal to 48 Fo. This filter PBEM is followed by a continuous filter DCEF, commonly referred to as a post-sampling filter which renders it possible to eliminate any spectral fold-back around the frequency 48 Fo, this filter also renders it possible to eliminate frequencies higher than 2 Fo (HE/2), it is comprised of, for example, a second-order cell in a Sallen-Key structure of the Butterworth type (reference 1). Taking account of the extensive working frequency range of the circuit BBAC, it is necessary to switch the cut-off frequency of this filter, which is obtained by means of the control signal B. Thus, the working frequencies Fo of the circuit BBAC can, for example, be in accordance with the control B, as follows:

B= "0" (VSS) 1200, 1800, 2400 3600, 4800, 6000, 7200

B= "1" (VDD) 9600, 12000, 24400, 19200.

The output of the continuous filter DCEF is connected to the terminal SF which itself is connected to one end of the exterior resistor IR (see FIG. 1). The second end of the resistor IR is connected to the terminal SR, the resistor IR is the input resistance of the transmission signal level adapting amplifier AEM. The terminal SR is connected to the inverting input of the amplifier AEM via an analog interruptor B3.1 which allows the connection (or disconnection) in accordance with the control signal BCL, of the input terminal SR to (from) the inverting input of the amplifier AEM. The non-inverting input of the amplifier is at the potential VREF. The output of the amplifier AEM is connected to the terminal SEM. The feedback resistor FR is arranged between the terminal SR and the terminal SEM (see FIG. 1). An analog interruptor B3.2 allows the connection (or disconnection), according to the control signal BCL, of the inverting input AEM to (from) its output. The transmission signal present at the terminal SEM is transferred to the transmission line amplifier ALE and is thereafter transmitted over the telephone line L (2 wires) via the line transformer LT. The amplifier AEM has for its object to provide the interface and the adaptation of the level of the signal at the output of the filter DCEF, it is arranged as a conventional inverter with the aid of exterior resistors IR and FR and its gain is always less than unity. The input signal and the output signal of AEM are analog signals which are symmetrical relative to the voltage VREF.

In the receiving direction, the signal received from a remote modem and passing through the telephone line L is switched in the region of the line transformer LT to the input of the receiving line amplifier ALR.

This received signal is a composite signal constituted by the signal which is actually transmitted by the remote modem and an echo signal which is basically caused by the mismatch between remote modems and the impedance differences between lines and modems. The output of the amplifier ALR is connected via the input terminal E1 of the circuit BBAC to the receiving low-pass filter PBRE which is preceded by a continuous filter DCRF. The filter DCRF is an anti-aliasing filter by means of which the frequencies over 2 Fo can be cancelled, and as is the filter DCEF, it is formed by, for example a second-order cell of a Sallen-Key structure of the Butterworth type (reference 1), and its cut-off frequency is also switchable by means of the control signal B. The filter PBRE has for its object to filter the analog signal received at E1, it is comprised of a fourth-order low-pass filter of the Bessel type (reference 1) whose cut-off frequency at −3 dB is, in this embodiment, equal to 1.25 Fo and its clock frequency HR is equal to 48 Fo. The output of the filter PBRE is connected to the output terminal S1. Arranged between the input terminal E1 and the input of the continuous filter DCRF there is an analog interruptor B3.3 which, according to the control signal BCL, allows the connection of the input of the filter DCRF to either the terminal E1 when the modem operates in the general mode (emission-reception), or to the input terminal EA within the framework of an internal test of the modem to insulate the receiving portion from the line and to permit a portion of the transmission signal to be re-injected (see FIG. 1). The terminal EA is also connected to a second analog interruptor B3.4 which allows an input of the equalizer EGA (input EB) to be connected either to the voltage REF in the general operating mode of the modem (transmission-reception) or to the terminal EA within the framework of the internal test of the modem, to the input EB of the equalizer, the fraction of the transmission signal applied to the terminal EA then being re-injected.

As has already been described in the foregoing, the filtered received signal (filtered by the filter PBRE), present at the terminal S1, has an echo component. This echo is estimated by the echo canceller EC, and is to be subtracted from the filtered received signal. To that end, the digital estimated echo signal present at the output (10 wires) of the echo canceller EC is converted into an analog signal by means of the digital-to-analog converter circuit DACC. The output signal of the circuit DACC is applied to the negative terminal of the differential circuit DC to be subtracted from the filtered receiving signal applied to the positive terminal of the differential circuit DC, the output of the circuit DC being connected to input E2 of the circuit BBAC.

The input terminal E2 corresponds to the input of an analog delay line ADN, advantageously it does not comprise more than four sample-and-hold circuits EB1, EB2, EB3 and EB4. The delay line ADN has for its object to produce a delay of two sampling periods between the input and the output of the 4 sample-and-hold circuits, which is illustrated by FIG. 3, which shows a time diagram with respect to the delay. This delay is necessary for a proper function of the echo canceller EC which in known manner uses the algorithm commonly referred to as the differential sign algorithm. The operating mode of such an echo canceller is described in French Patent Specification no. 2,534,427. The operating principle of the line ADN is described also with reference to FIG. 3. A sampling clock shaping circuit CS receives at its input, via the circuit PLC, the sampling clock HE (shown in FIG. 3, line a) and produces three signals HE1, HE2, HL. The signal HE1 (FIG. 3, line b) is the sampling clock of the sample-and-hold circuits EB1 and EB3. The signal HE2 (FIG. 3, line c) is the sampling clock of the sample-and-hold circuits EB2 and EB4. The sampling operation is preceded by an auto-zero period (reference AZ) whose duration renders it possible to satisfy the settling time (reference EST) of the circuit DACC which is subjected to a new conversion at the falling edge of the clock HE. A data n will not be validated until after the settling time EST calculated from the beginning of the auto-zero period AZ, this data n will be sampled during the remaining time SAT of the period of HE1 or HE2. The lines d, e, f, g represent the respective periods of time during which the data are sampled by the sample-and-hold circuits EB1, EB2, EB3, EB4. The line h of FIG. 3 shows a clock signal HL present at an output of the circuit CS and allows the display of the delay of two sampling periods for a reading operation at the leading edges of the clock signal HL.

A signal comparison arrangement cooperates with the comparison arrangement line ADN. This delay is comprised of three converter circuits C1, C2, C3, and serves to supply a logic signal in dependence on the comparison of the analog input signals. The logic signal at the output of the converter C1 which has non-inverting inputs is representative of the sign of the sum of the signals at the output of the sample-and-hold circuits EB1 and EB4. To that end, the output signals of the sample-and-hold circuits EB1 and EB4 are present at the non-inverting inputs of the comparator C1. The logic signal at the output of the comparator C2 is representative of the sign of the difference between the signals at the outputs of the sample-and-hold circuits EB1 and EB4. For that purpose, the output signal of the sample-and-hold circuit EB1 is applied to the non-inverting input of the comparator C2, while the output signal from sample-and-hold circuit EB4 is applied to the inverting input of the comparator C2. The logic signal at the output of the comparator C3 is representative of the sign of the difference between the output signal of the sample-and-hold circuit EB1 and the reference voltage VREF. To that end, the output of the sample-and-hold circuit EB1 is applied to the non-inverting input of the comparator C3 and the signal VREF is applied to the inverting input of the comparator C3. The outputs of the comparators C1, C2, C3 may have the value "0" (VSS) for a negative sign.

The outputs of the comparators C1, C2, C3 are connected to the inputs of a register LAT which has for its object to store at a rising edge of the clock HL (transmitted by the circuit CS) the logic values of the outputs of said comparators C1, C2, C3. Actually, with the object of simplifying the construction of the analog circuit BBAC, the circuit BBAC comprises, to enable sampling, even at a slight overlap, of a data n in a predetermined circuit and said data delayed by two sampling periods (n−2), an analog delay line which is formed from only four sample-and-hold circuits which are connected to a latch-type register. Thanks to such a connection, it is no longer necessary to use five sample-and-hold circuits which are indispensable to obtain a sampling of two data delayed relative to each other by two sampling periods, and since it is easier to obtain an integrated latch-type register than a fifth sample-and-hold circuit, the structure of the circuit BBAC is simplified. Thus, when examining FIGS. 3d, 3g and 3h of FIG. 3, it will be apparent that, even with a slight overlap, the register LAT stores at the ascending edge n of the clock HL:

*n+(n−2) at the output of the comparator C1

*n−(n−2) at the output of the comparator C2

*n−VREF at the output of the comparator C3.

The outputs of the register LAT are connected to the outputs of the circuit BBAC. The output which is representative of the state of the comparator C1 is connected to the terminal SS relative to the sign of the sum of the output signals of the sample-and-hold circuit EB1 and EB4. The output which is representative of the state of the comparator C2 is connected to the terminal SD relative to the sign of the difference between the output signals of the sample-and-hold circuits EB1 and EB4. The output which is representative of the state of the comparator C3 is connected to the terminal SI relative to the sign of the output signal of the sample-and-hold circuit EB1 with respect to the voltage VREF (knowing that the voltage VREF=(VVD−VSS)/2). So as to enable the performance of the internal tests of the modem, three interrupters are inserted between the three outputs of the register LAT and the three output terminals SS, SD, SI. The three interrupters are controlled by the logic terminal BAE and authorize the connection of the outputs SS, SD and SI either, as described above, to the three outputs of the register LAT, or to the voltage VSS ("0") for the outputs SS and SD and to the voltage VDD ("1") for the output of SI. The three outputs SS, SD, SI are transferred (3 wires) to the calculating member of the echo canceller EC of the circuit PLC.

In the circuit BBAC, the automatic equalizing function is provided by the automatic equalizing circuit EGA. The circuit EGA is designed to compensate for amplitude distortions to which the received signal is subjected. The line L can be characterized as a low-pass filter which significantly attenuates the high frequency components relative to the low frequency components contained in the transferred signal. The equalizing circuit must have characteristics which are controlled as a function of the level of the received signal which varies in relation with the length of the line. The attenuated components must be amplified such that the transmitted signal is recovered. To that end the automatic equalizing circuit is comprised of a high-gain amplifier which is followed by a passband equalizer filter having switched capacitors to adapt itself automatically to the frequency of the data without adjustments of the slopes, the cut-off frequency varying automatically, the passband filter being formed from high-pass and low-pass filters of the same type formed around operational amplifiers which are designed to clip the signals in a symmetrical manner relative to a predetermined voltage when operating in a non-linear mode.

Thus, when the line is low, the received signal is weak. The equalizing circuit then behaves in a linear manner and corrects the selective attenuation caused by the line. The slope of the high-pass filters correspond to a correction of a line having average characteristics and a maximum length. The low-pass filters cut the high frequency (higher than the bit frequency). When the line is short, the received signal is at a high level. It is then amplified by the high-gain amplifier and thereafter by the high-pass filters. It thus rapidly reaches the clipping value. The transfer function of the equalizer filter develops and the cut-off frequency of the high-pass filter is modified. For a high gain (higher than or equal to four of the amplifier preceding the equalizing filter, the variation in the transfer function due to whether the signal is clipped to a greater or less extent reliably follows the characteristic of the line. It should be noted that the shorter the line, and consequently the lesser its attenuation, the stronger is the signal received and thus the transfer function of the equalizer filter corrects the signal relatively less. It is important for the clipping to remain symmetrical, with respect to a voltage which here is the reference voltage VREF= (VDD−VSS)/2, across the overall width of the filter.

The implementation of filters of this type is subjected to certain constraints as regards the choice of operational amplifiers (asymmetrical supply voltage when they clip in an asymmetrical manner, high band gain product, maximum input voltage higher than or equal to the maximum output voltage). These operational amplifiers may, for example, be of the type TLC 071 marketed by Texas Instruments.

The problem of providing an equalizer circuit which operates without control is stored in this manner.

The output signal of the sample-and-hold circuit EB1 is applied to the automatic equalizing circuit EGA to be also sampled there. However, the output signal of a sample-and-hold circuit is negatively influenced (noise due to the switching action) which worsens the signal-to-noise ratio and moreover in the present case an auto-zero period has been imposed on the sample-and-hold circuits to allow for the settling time of the circuit DACC, during which periods no sampling should take place if one does not want to alter the content of the data. Therefore, in accordance with a preferred embodiment of the circuit according to the invention, a pre-equalizer filter is connected to the high-gain amplifier at the input of the automatic equalizing circuit EGA for presampling the data and filtering the noise caused by the switching action, thus improving the signal-to-noise ratio, the pre-equalizer filter being in addition sampled at a frequency which is a multiple of the frequency used for the other functions of the circuit for a reliable recovery of the content of the data. The signal coming from the sample-and-hold circuit EB1 is presampled in the pre-equalizing filter PREG and the signal to be equalized is prefiltered. The pre-equalizing filter PREG is a first-order low-pass filter (reference 1) which uses a sampling frequency of 12 Fo, so that it is not necessary to remove the auto-zero portion from the sample-and-hold circuit. The cut-off frequency of $-3$ dBfc is switchable as a function of an exterior command applied to the terminal CP:

For CP= "0" (VSS) then fc=0.22 Fo.

for CP= "1" (VDD) then fc=0.4 Fo.

This filter, connected to the high-gain amplifier has three input ports. The input EA which receives the output signal from the sample-and-hold circuit EB1 has a gain equal to 4. The input EB which is connected to the analog interrupter B3.4 thus receives the signal VREF when the modem functions in the normal transmission-receiving mode and the signal present at the terminal EA when a test is performed in the modem, this terminal EB is given a gain equal to ¼. Finally, the input E3 is the input which is connected to the output of the equalizer EGA to compensate for the shift voltage present at the output of the equalizer, this input has a gain of 2.

The output signal of the pre-equalizing filter PREG connected to the high-gain amplifier is then applied to the input of an equalizing low-pass filter EG comprising switched capacitors. The signal is automatically and symmetrically clipped relative to the voltage VREF and its amplitude is limited to, for example, ⅘ of VDD and to ⅕ of VDD. The filter EG is comprised of by four separate second-order filters (reference 1), a high-pass filter followed by a low-pass filter which in its turn is followed by a high-pass filter followed by a low-pass filter, the two high-pass filters being identical and the two low-pass filters also being identical. Finally, all these filters are sampled at the frequency 48 Fo.

The output signal of the filter EG is filtered by integrating circuit RCE which has a time constant which differs only little from ¼ Fo and is thereafter applied to the non-inverting terminal of a comparator C4 whose inverting input is brought to the potential VREF. The role of the comparator C4 is to convert the output signal of the equalizer EGA from the biphase code into a binary code. The output signal of the comparator C4 is transferred to the terminal DCR via a logic interrupter IE4 which is controlled by the signal BAE, the terminal DCR then carries either a voltage VDD when the modem effects an internal test, or the output signal from the comparator C4, when the modem functions in the normal transmission-receiving mode. The terminal DCR is connected to the circuit PLC where the signal is processed by a descrambling circuit DSC at whose output the received data signal RD is present which is to be conveyed over the wire 104 (standard RS 232/V 24) and is also used to recover the clock by means of a synchronizing circuit BS at whose output the receiving clock RCL transferred over the wire 115 (standard RS 232/V 24) is present.

To provide an observation point between the output of the filter EG and the comparator C4 an amplifier AO is provided which is arranged as a tracking amplifier and consequently has a gain equal to unity. The output of the amplifier is connected to the terminal OE which thus represents the copy of the analog signal originating from the equalizing circuit EGA.

Moreover, a shifting voltage may be present at the output of the operational amplifiers used in the equalizing circuit EGA which, multiplied by the gain, significantly disturbs the symmetry of the clipped signal. In this case it is sufficient to compensate for this shifting voltage. During a transmission in the baseband it is possible to scramble the transmitted data before they are encoded, this is the object of the scrambler SCR provided in the logic circuit PLC. At the output of the scrambler SCR there is then a pseudo-random digital message assembled from an equal number of zeroes ("0") and ones ("1"), when this message is examined over a sufficiently long period. The mean value of the signal with respect to the biphase-encoded data message is zero in this case. When this signal is received and equalized, its mean value must remain zero. When this is no longer the case, this indicates that a shift voltage has superposed itself on the signal. This shift voltage must then be corrected in order to recover the property that the mean value of the received signal must be zero. The reason for this is that in accordance with a characteristic of the circuit according to the invention this circuit moreover has two connection terminals one of which is connected to the input and the other one to the output of the automatic equalizing circuit to provide there a connection for an integrating cell, thus forming a shift voltage cancelling loop which imposes a zero mean value on the output signal of the equalizing circuit. This is the object of the integrating cell RC (see FIG. 1) which is arranged between the output SEG of the circuit EGA and its input E3. In this manner, when the signal at the input of the comparator C4 is not subject to any parasitic shift voltage, the number of "0" and "1" at the output of the comparator is identical and the shift voltage correction voltage at the output of the integrating cell RC and consequently at the input E3 is VREF=(VDD–VSS)/2. If, on the contrary, the equalizer circuit generates a shift voltage at the input of the comparator, an unbalance between the numbers of "0" and "1" is observed at its output. The shift voltage correcting voltage then varies in the reverse direction around the position (VDD–VSS)/2 and forces the system to modify the shift voltage at the input of the comparator. When balance is obtained for a given correction voltage, it remains in existence as long as there is coincidence between the numbers of "0" and "1". In practice a simple resistor-capacitor circuit is sufficient to integrate the signal at the output of the comparator. During experiments the results obtained with switched-capacitor filters which are major sources of shift voltages have shown that this realization is well-founded.

The modem thus obtained by connecting the integrated analog circuit BBAC to the predefined logic circuit PLC can, as has been described in the foregoing, operate either in the transmission-receiving mode, or in the test mode, the operating mode being selected by means of the control signals BCL and BAE.

The logic interrupters IE1, IE2, IE3, IE4 are controlled by the signal applied to the terminal BAE.

If BAE= "0" (VSS), the error signals SS, SD, SI are transferred to the echo canceller EC and the data signal ECR is transmitted to the descrambling circuit DSC, the mode of operation is then normal (transmission-reception), SS being the output signal of the comparator C1, SD being the output signal of the comparator C2, SI the output signal of the comparator C3 and DCR the output signal of the comparator C4.

If BAE= "1" (VDD), the echo canceller is then blocked, the terminals SS and SD being brought to the potential VSS while the terminals SI and DCR are brought to the potential VDD.

The control signal BCL acts on the analog interruptors B3.1, B3.2, B3.3, B3.4 and allows the selection of the loop test three, which in transmission equipment consists in feeding back a fraction of the transmitted signal to the receiving side, while no signal must be transmitted or received from the line or from the junction.

If BCL= "1" (VDD), the modem operates in the transmission-receiving mode, the interrupter B3.1 connects the input SR to the input of the amplifier AEM, the interrupter B3.2 disconnects the input of AEM from its output, the interruptor B3.3 connects the input of the receiving filter PBRE to the terminal E1 and the interrupter B3.4 connects the input EB of the equalizing circuit to the voltage VREF.

If BCL= "0" (VSS), the modem is set to the loop test three mode. The interrupter B3.1 disconnects the input SR from the input of the amplifier AEM, the interrupter B3.2 connects the input of AEM to its output (AEM short circuited), the interrupter B3.3 connects the input of the filter PBRE to the input terminal EA (fraction of the transmission signal re-injected in the input of PBRE) and the interrupter B3.4 connects the input EB of the equalizer to the input terminal EA.

Such a circuit connected to the predefined logic circuit is very interesting as regards its use in a baseband modem. In addition to its performances determined during experiments and its complete automation, it is remarkable as regards its very high integration.

What is claimed is:

1. An analog circuit associated with a predefined logic circuit for forming a modem which is connected to a transmission channel for receiving data transmitted and for transmitting data to be transmitted at a desired rate over said transmission channel, said modem comprising:

an echo canceller operating on the basis of a differential sign algorithm and having:
an echo canceller input for receiving signal representing said data to be transmitted;
a synthesizer filter having a filter output, an error input and a filter input connected to said canceller input for providing an analog synthesized echo signal at said filter output in accordance with an error signal applied to its error input; and
a difference circuit for providing a difference signal which represents the difference between said analog synthesized echo signal and said data received from said channel;

said analog circuit being integrated as a CMOS circuit and further comprising:
a clock input port for receiving a clock signal which represents said desired rate;
a transmission section having:
an input port for receiving data to be transmitted coming from said predefined logic circuit;
at least one transmit filter unit for filtering the data to be transmitted, said filter having switched capacitors driven by a signal derived from said clock input; and
an output port for transmitting over the transmission channel the filtered data to be transmitted; and
a receiving section having:
an input port for receiving said transmitted data coming from the transmission channel;
a processing unit comprising at least receiving filter units for processing the received data, said filter units comprising switched capacitors driven by a signal derived from said clock input;
an output port for supplying processed transmitted data to the predefined logic circuit;
delay means having a cascade of sample-and-hold circuits which are controlled by phase-shifted signals derived from the clock signal and which receives said difference signal from said difference circuit;
a plurality of comparing circuits having inputs which are branched at selected points of said cascade of sample-and-hold circuits; and
a latch-type register for receiving the output signals of the comparing circuits and for providing signals to said error input of said synthesizer filter.

2. An analog circuit as claimed in claim 1, for forming said modem in which an offset cancelling loop is provided and comprising scrambling means for supplying said modem with data having a mean value equal to zero, said analog circuit further comprising:

an input filter with an output, at least a first input and a second input, the first input being said input port of said receiving section for receiving the data having a mean value equal to zero;

an input terminal comprising said second input of the input filter and an output terminal for connecting an integrating cell; and a shift level detector having an input for receiving a signal coming from said output of the input filter and an output for providing a signal to said output terminal.

* * * * *